(12) United States Patent
Madlener et al.

(10) Patent No.: US 7,269,911 B2
(45) Date of Patent: Sep. 18, 2007

(54) TOUCH PROBE

(75) Inventors: Wolfgang Madlener, Königsbergerstrasse 12, D-88212 Ravensburg (DE); Wilfried Veil, Schornreuteweg 15, D-88212 Ravensburg (DE); Matthias Armbrust, Wangen (DE)

(73) Assignees: Wolfgang Madlener, Ravensburg (DE); Wilfried Veil, Ravensburg (DE)

( * ) Notice: Subject to any disclaimer, the term of this patent is extended or adjusted under 35 U.S.C. 154(b) by 12 days.

(21) Appl. No.: 11/358,727

(22) Filed: Feb. 21, 2006

(65) Prior Publication Data
US 2006/0196067 A1 Sep. 7, 2006

(30) Foreign Application Priority Data

Feb. 24, 2005 (DE) ............. 10 2005 008 822
Apr. 6, 2005 (DE) ............. 10 2005 015 889

(51) Int. Cl.
*G01B 5/00* (2006.01)
*G01B 7/00* (2006.01)

(52) U.S. Cl. ............................................. 33/561
(58) Field of Classification Search ............ 33/561, 33/558; 324/754
See application file for complete search history.

(56) References Cited

U.S. PATENT DOCUMENTS

| | | | |
|---|---|---|---|
| 4,153,998 A | | 5/1979 | McMurtry |
| 4,769,919 A | * | 9/1988 | Lloyd et al. ............... 33/558 |
| 5,319,858 A | * | 6/1994 | Coy ............................ 33/561 |
| 5,659,969 A | | 8/1997 | Butler et al. |
| 5,669,152 A | * | 9/1997 | McMurtry ................. 33/559 |
| 5,756,886 A | * | 5/1998 | Nishimura et al. ....... 73/105 |
| 6,275,053 B1 | * | 8/2001 | Morrison et al. ......... 324/754 |
| 6,526,672 B1 | * | 3/2003 | Danielli et al. ............ 33/561 |
| 6,760,977 B2 | * | 7/2004 | Jordil et al. ................ 33/558 |
| 7,168,179 B2 | * | 1/2007 | Baruchello et al. ....... 33/561 |

FOREIGN PATENT DOCUMENTS

| | | |
|---|---|---|
| DE | 249 573 A1 | 5/1986 |
| DE | 36 23 614 A1 | 1/1988 |
| DE | 36 27 103 C1 | 1/1988 |
| DE | 38.11 235 A1 | 10/1989 |
| DE | 33 17 299 C2 | 8/1993 |
| DE | 699 19 457 T2 | 1/2005 |
| EP | 0 967 455 B1 | 6/1999 |

OTHER PUBLICATIONS

U.S. Appl. No. 11/358,902, filed Feb. 21, 2006, Madlener et al.

\* cited by examiner

*Primary Examiner*—Christopher W Fulton
(74) *Attorney, Agent, or Firm*—Burr & Brown

(57) ABSTRACT

A touch probe is provided, including a deflectable stylus with a rest position mechanism on which the stylus is arranged, and a housing in which the rest position mechanism is accommodated. The rest position mechanism comprises a stylus holder with carrying elements and seating elements corresponding to the carrying elements that interact with the carrying elements to arrange the stylus holder in the touch probe. The carrying elements and seating elements form a sensing circuit which is closed when the carrying elements are in contact with the seating elements and which is open when one of the carrying elements is not in contact with a corresponding seating element. The rest position mechanism includes a spring element, which urges the stylus holder against the seating elements to position the stylus holder. Setting means, which allow setting of the pressing force of the spring element, are provided in the stylus holder.

21 Claims, 3 Drawing Sheets

TOUCH PROBE

FIELD OF THE INVENTION

The present invention relates to a touch probe.

BACKGROUND OF THE INVENTION

The German translation DE 699 19 457 T2 of European patent EP 0 967 455 discloses a touch probe of the type which comprises a stylus holder and a stylus which can enter into contact with a workpiece and which is connected to the stylus holder. The touch probe also includes seating elements, carrying elements provided on the stylus holder which interact with the seating elements to arrange the stylus holder in the touch probe, and an electric circuit. The stylus holder is elastically urged against the seating elements by a spring element. Part of the electric circuit is made up by the seating elements. The electric circuit is closed when the carrying elements are in contact with all the seating elements. An interruption of the electric circuit takes place whenever one of the carrying elements loses contact with one of the seating elements. The touch probe also comprises electrically conducting elements, which form part of the electric circuit and which are arranged such that they connect the seating elements to one another. A clamp, which applies a clamping force which clamps the seating elements in position, is also provided.

In comparison with adhesively bonded seating elements that are also known from the prior art (cf. U.S. Pat. No. 4,153,998), advantages are indeed obtained by the touch probe according to the present invention with regard to the mounting and reliable electrical insulation of the seating elements.

SUMMARY OF THE INVENTION

The present invention is based on the object of further improving a touch probe of the type described above.

The present invention is based on a touch probe which comprises a deflectable stylus having a rest position mechanism on which the stylus is arranged and a housing in which the rest position mechanism is accommodated. The rest position mechanism includes a stylus holder with carrying elements and seating elements which correspond to the carrying elements and which interact with the carrying elements in order to arrange the stylus holder in the touch probe. The carrying elements, the seating elements and electrical conducting means also form a sensing circuit which is closed when the carrying elements are in contact with the seating elements and which is open when one of the carrying elements is not in contact with a corresponding seating element. In addition, the rest position mechanism comprises a spring element which urges the stylus holder against the seating elements to position the stylus holder.

The present invention also includes setting means, which allow setting of the pressing force of the spring element, that are provided in the stylus holder.

As a result, setting the spring force on the stylus holder can be performed in an elegant way from the direction of the stylus. For this purpose, it is preferred that the setting means have a setting element which is adjustable in the longitudinal direction of the touch probe. For example, the stylus can be removed to access the setting means, for example, to access a screw element inside the stylus holder to adjust the latter. Consequently, the touch probe can remain fitted in a holder while the spring force is being set.

Furthermore, it is preferred that the spring element comprises a spring wire which is formed toward the stylus holder as a pin which runs in the direction of the axis of the touch probe and that a recess for the pin is provided in the stylus holder. The setting of the spring force can then take place, for example, by turning the part of the stylus holder in which the recess is provided. In this case, this part turns with respect to the spring element, whereas the spring element does not turn with it. The turning operation preferably has the effect that the linear position of the part with the recess changes, so that the spring can either be biased more or allowed to relax.

It is also preferred that the carrying elements are fastened on the stylus holder by a clamping device.

This procedure is based on the recognition that, in the case of carrying elements that are merely inserted in a stylus holder, inaccuracies in the measuring operation of the touch probe can occur, in particular due to bending. The separate bracing of the carrying elements, for example by means of a plate which is fastened by screw means, has the effect of producing a rigid arrangement, with which an improvement of the measuring accuracy of the touch probe can be achieved, in particular with regard to the reproducibility of a measuring point.

A further improvement of the measuring accuracy of the touch probe can be achieved if the carrying elements are arranged in the stylus holder in bushing means made of a comparatively hard material. Metal or a sintered material, for example a sintered ceramic, may be used as the material. In order to obtain a snug fit of the bushing on a carrying element, for example, a cylindrical carrying element, the bushing may be slit or divided.

To form the desired sensing circuit, it is further provided that the bushing means are formed such that they electrically insulate the carrying elements with respect to the stylus holder. This ensures that the carrying elements do not short-circuit the circuit with seating elements and carrying elements via the stylus holder.

Furthermore, it is preferred that electrical conducting means are connected to at least one seating element, preferably to all of the seating elements, in each case, by contact in which electrical conducting means are secured directly on the at least one seating element, preferably on all the seating elements. This provides that the contact forces are separately provided for the respective seating element and have a neutral external force effect. In this way, high contact reliability can be realized. Moreover, the seating elements can be clamped independently of an electrical connection of the seating elements, which has positive effects on the mounting of the stylus holder.

The electrical conducting means may be connected to a seating element for example by permanent electrical contacting. The connection may take place, for example, in the form of a soldered or welded connection, for example, by an ultrasonic welding method.

In order to ensure high contact reliability, it is in this case preferred that the connecting point includes a surface structure which has an electrical contact property that is improved with respect to the remaining seating element material. The surface structure is preferably created over only part of the surface of the seating element, so that the material properties of the seating element as a bearing are still available.

Gold comes into consideration, for example, as a coating on the contact point.

Further permanent connections may be realized in the form of a screw, plug-in, snap or bayonet, adhesive or press-fit connection. For example, an electrical conducting means is pressed into a prepared recess of the seating element. In the case of an adhesive connection, it is preferred that the adhesive itself has good electrical conducting properties, so that the adhesive joint has lowest possible contact resistance.

In a further particularly preferred aspect of the present invention, the seating elements are pressed by means of a clamping device in recesses of a carrier separately mounted in the housing. This allows particularly rigid fixing of the seating elements in the housing to be realized.

In order to obtain a rigid arrangement, it is preferred that the carrier consists of a metal or a similarly hard material, but has an electrically insulating surface. This is required in order for the seating elements to be electrically insulated with respect to the housing.

In order to obtain electrical access to the circuit, it is also provided that the circuit preferably has two commercially available contacts, which have spring contact pins.

A further aspect of the present invention is that the housing is cup-shaped, that is to say does not have any significant openings on one side, and therefore can only be loaded through a cup opening on one side. If necessary, comparatively small access openings are provided in the bottom of the cup, which is integrally connected to the housing. However, the cup is preferably completely closed at the bottom.

This allows the housing to be formed in a stable manner. Furthermore, it is possible to dispense entirely with the attachment of a screwed or otherwise fastened cover element on one side.

In the case of this embodiment, the structural design should be chosen such that at least all the essential parts of the inside of the touch probe, preferably all of the parts, are introduced through the cup opening on one side, but also such that corresponding fastening of the parts is possible from this side.

In order to achieve a low-cost construction of the touch probe, it is additionally preferred that the carrying elements are commercially available pin elements, in particular in accordance with DIN.

Furthermore, it is advantageous that the touch probe is filled with oil, which is optimized, in particular with regard to its sliding properties.

A further aspect of the present invention is that the touch probe contains a vibration device. Vibrations on the touch probe allow a secure seating of the carrying elements on the seating elements to be achieved, with correspondingly high positioning accuracy.

In a preferred embodiment of the present invention, the vibration device is designed such that vibrations are transmitted to the touch probe for a predeterminable time period after closing the sensing circuit. As a result, the carrying elements reach an end position between the seating elements even after a short time, so that high switching repetition accuracy can be realized, since the end position of the carrying elements is reproducible to a high degree.

In a preferred configuration, a vibration device may comprise an unbalanced motor.

BRIEF DESCRIPTION OF THE DRAWINGS

An exemplary embodiment of the present invention is explained more precisely below with further advantages and details as it is shown in the accompanying drawings, in which.

DETAILED DESCRIPTION OF THE INVENTION

Figure 1:
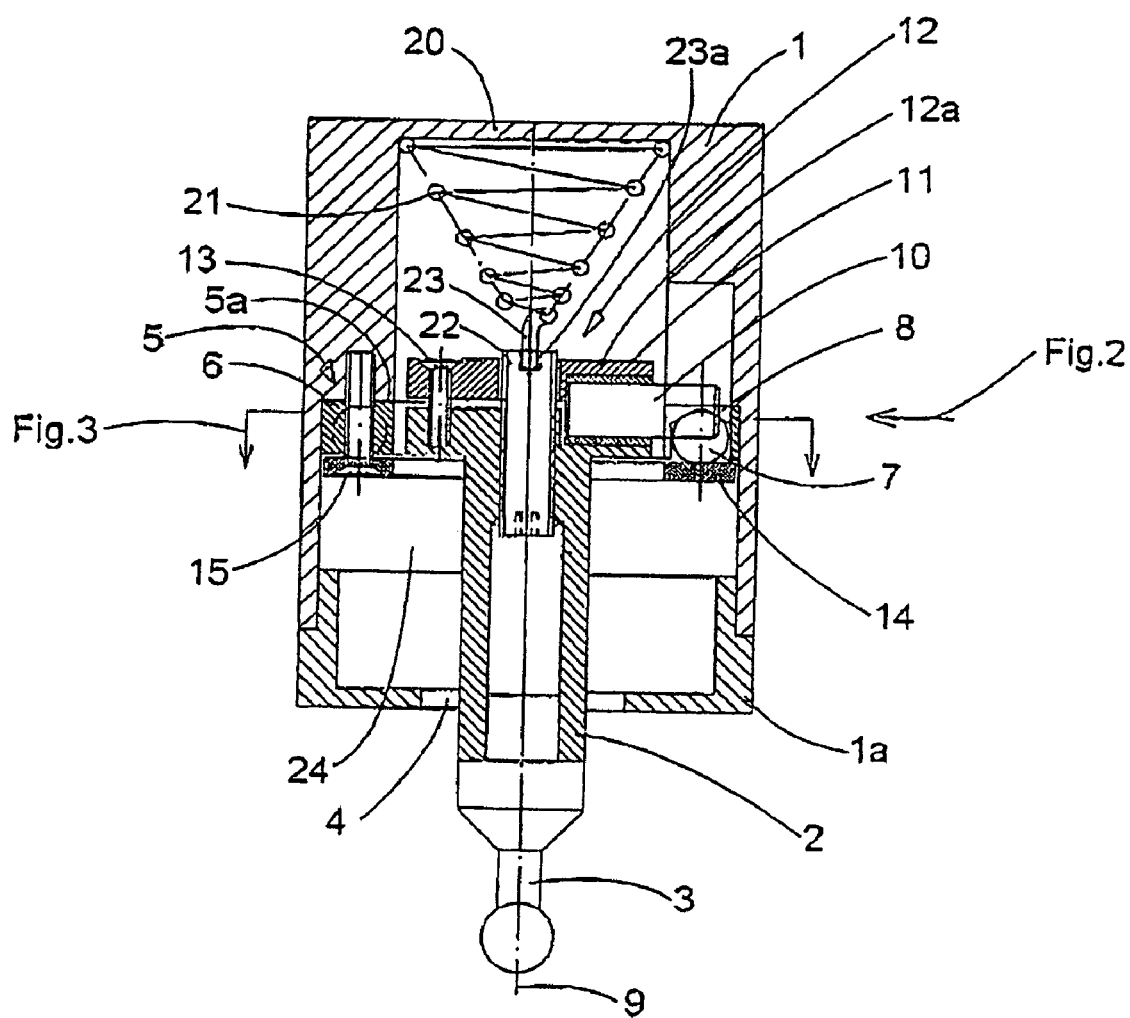
FIG. 1 is a schematic cross-sectional view through a touch probe.

FIG. 1 shows a touch probe with an outer housing 1, which preferably consists of steel and has a stepped inner form 5.

Arranged in the housing 1 is a stylus holder 2 with a stylus 3. The stylus 3 and part of the stylus holder 2 protrude from the housing 1 in the direction of the longitudinal axis 9 of the touch probe through an opening 4 in a cover element 1a of the housing 1. As a result, the stylus 3 is capable of touching a workpiece or tool or being touched by it when a relative movement takes place between the touch probe and the workpiece or tool.

Seated on an offset 5a of the stepped inner form 5 of the housing 1 is a carrier 6 for receiving seating elements 7, shown here in the form of balls. In the carrier 6 there are recesses 8 for receiving the balls 7. The recesses 8 are arranged in pairs. Three pairs are respectively positioned such that they are offset by 120° about the axis 9. The recesses 8 are in this case shaped such that, when the balls 7 are pressed into the recesses 8, they are clamped such that kinematically stable mounting is obtained. The recesses 8 may for example have the form of a cone or a three-sided pyramid, at least in certain portions.

The spacing of the balls 7 in a pair is such that they can be bridged by a roller 10 of the stylus holder 2 to bring about an electrical contact and form a stable seat for the roller.

The carrier 6 for the balls 7 preferably consists of metal, in order to ensure the most rigid possible mounting of the balls 7. In this case, the surface of the recesses 8 for receiving the balls 7 at least is preferably provided with an electrically insulating layer. The carrier 6 may therefore consist for example of aluminum, the surface of which has been given an electrically insulating property by anodizing.

Figure 2:
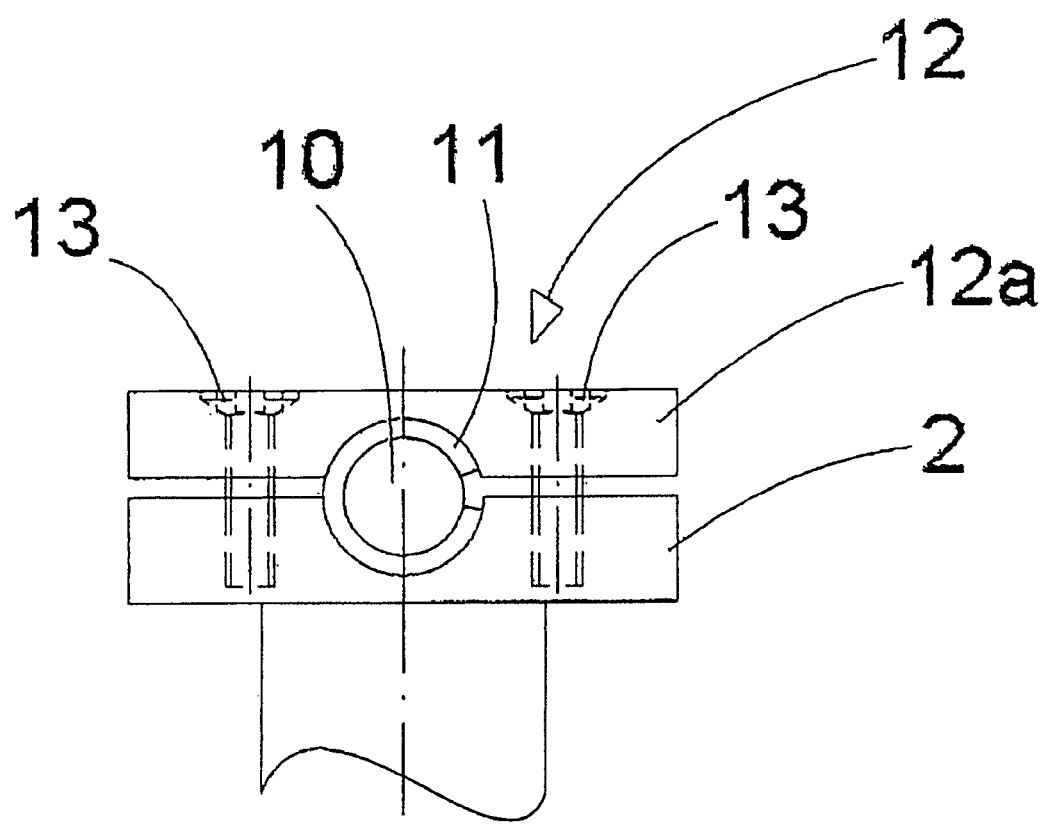
FIG. 2 is a view from the right of part of the rest position mechanism, which comprises a clamping device for a carrying element.

The balls 7 are pressed into the recesses 8 of the carrier 6 by means of a clamping device 14, 15. At the same time, the carrier 6 is also fixed on the housing 1 by the clamping devices 14, 15. The pressing force on the balls 7 is applied, for example, by at least two screws 15, which for example draw a clamping ring 14 of the clamping device toward the step 5a of the housing. In order to obtain the best-possible fixing of the balls 7, six screws 15 are preferably used, each screw being positioned as close as possible to one of the six balls 7 in each case. The rollers 10 are mounted in bushings 11, which may be slit or divided along their length (also see FIG. 2 in this respect). In particular in the case of a slit or divided configuration of the bushings, the rollers 10 can be rigidly fixed in the stylus holder 2 by means of a clamping device 12 of the stylus holder 2.

The bushings 11 and a plate 12a of the clamping device 12 are preferably made of metal, in order to obtain the most rigid possible fixing of the rollers. The surface of the bushings and the clamping device preferably have an electrically insulating layer. The bushings and the plate 12a of the clamping device 12 may consist for example of aluminum, the surface of which has an electrically insulating property as a result of anodizing. The clamping force on the bushings 11 and also the rollers 10 is applied, for example, by at least two screws 13, which draw the plate 12a of the clamping device 12 toward the rest of the stylus holder.

In order for the touch probe to generate a signal when the stylus 3 changes its position, either by tilting or vertical movement, the balls 7 are electrically connected in series and form a circuit in which the rollers 10 establish an electrical contact between the two balls of each pair of balls.

Figure 3:
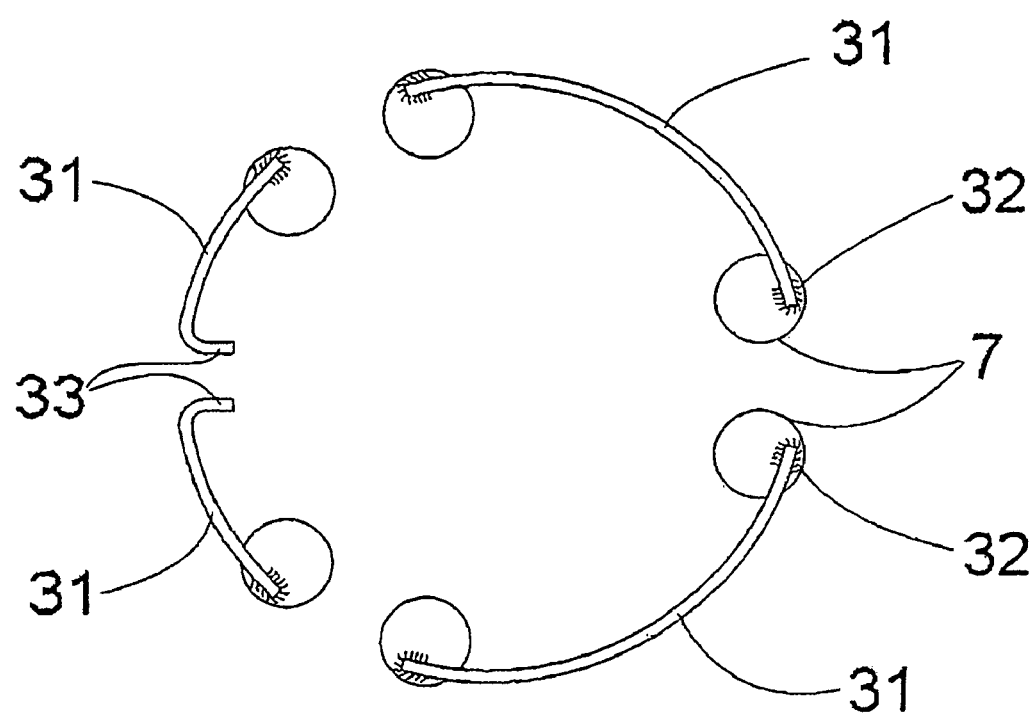
FIG. 3 is a plan view of an arrangement of supporting elements of the touch probe as shown in FIG. 1 that are connected to one another in an electrically conducting manner.

In order to connect the balls 7 and the rollers 10 to form a complete circuit, a conducting means, preferably an element 31 in wire form, respectively between two balls of adjacent pairs of balls, is firmly connected to the balls 7 at a point 32 (see FIG. 3 in this respect). At the ends 33 of the elements 31 in wire form, a switching signal can be brought out.

At least at the soldered joint 32, the balls 7 advantageously have a coating which ensures good adhesion for a soldered connection. In a preferred embodiment, the coating is not applied over the entire ball but only in the region of the soldered joint or in the region of the soldered joint and regions which do not serve as bearing surfaces for the ball itself or the roller. A coating in the region on which the carrying elements 10 lie may be disadvantageous. The coating of the balls 7 preferably consists of gold.

In FIG. 3, the connection between the electrical connecting element 31 and a seating element 7 is indicated symbolically by many small lines. This symbolic representation may, for example, also stand for a different type of connection means such as an adhesive connection or a welded connection, including an ultrasonic welded connection, for example.

A preferably conical helical spring 21, supported on a bottom 20 of the housing 1, urges the stylus holder 2 into its zero position, which is predetermined by the combination of rollers 10 and balls 7.

A setting element 22, which is integrated in the stylus holder 2 and can be moved in relation to the stylus holder 2 in the direction of the axis 9, preferably by means of a thread, provides the possibility of setting the compressive force of the helical spring 21 on the stylus holder 2.

For this purpose, it is merely required that the stylus 3 is removed. As a result, the complete touch probe can remain in a mount, for example of a measuring machine, during a setting operation.

The helical spring 21 comprises a pin 23 in the axial direction, which is seated in a recess 23a in the stylus holder 2.

Preferably, a series connection of electrically conducting connecting elements 31, balls 7 and rollers 10 is externally contacted at the ends 33 of the connecting elements 31. Or, considered in functional terms, at these points it is preferably possible for a switching signal to be brought out by interruption of the circuit.

While the present invention has been particularly shown and described with reference to the preferred mode as illustrated in the drawings, it will be understood by one skilled in the art that various changes may be effected therein without departing from the spirit and the scope of the invention as defined by the claims.

The invention claimed is:

1. A touch probe, comprising:
   a deflectable stylus having a rest position mechanism on which the stylus is arranged; and
   a housing in which the rest position mechanism is accommodated;
   wherein the rest position mechanism comprises a stylus holder including a plurality of carrying elements and a plurality of seating elements corresponding to the carrying elements and which interact with the carrying elements to arrange the stylus holder in the touch probe, wherein the carrying elements and the seating elements form a sensing circuit via a plurality of electrical conducting means, such that the sensing circuit is closed when the carrying elements contact the seating elements and the sensing circuit is open when at least one of the carrying elements does not contact a corresponding seating element; and
   wherein the rest position mechanism further comprises a spring element for positioning the stylus holder against the seating elements by pressing the stylus holder against the seating elements in conjunction with setting means that allows the pressing force of the spring element to be set.

2. The touch probe as claimed in claim 1, wherein the setting means comprises a setting element that is adjustable in a longitudinal direction of the touch probe.

3. The touch probe as claimed in claim 1, wherein the spring element comprises a spring wire which extends toward the stylus holder as a pin in a direction of a longitudinal axis of the touch probe, and wherein a recess for the pin is provided in the stylus holder.

4. The touch probe as claimed in claim 1, wherein the carrying elements are fastened to the stylus holder by a clamping device.

5. The touch probe as claimed in claim 4, wherein the clamping device comprises a plate with screw means.

6. The touch probe as claimed in claim 1, wherein the carrying elements are arranged in the stylus holder in bushing means made of a hard material, selected from the group consisting of a metal and a sintered material.

7. The touch probe as claimed in claim 6, wherein the bushing means is formed such that the bushing means insulates the carrying elements with respect to the remainder of the stylus holder.

8. The touch probe as claimed in claim 1, wherein the electrical conducting means is directly secured and connected to at least one of the seating elements.

9. The touch probe as claimed in claim 8, wherein each of the electrical conducting means is directly secured and connected to each seating element, respectively.

10. The touch probe as claimed in claim 1, wherein the electrical conducting means is connected to at least one seating element, by a permanent electrical contacting means.

11. The touch probe as claimed in claim 10, wherein the permanent electrical contacting means comprises a fused connection.

12. The touch probe as claimed in claim 10, wherein the permanent electrical contacting means comprises a press-fit connection.

13. The touch probe as claimed in claim 10, wherein the permanent electrical contacting means comprises an adhesive connection.

14. The touch probe as claimed in claim 10, wherein each of the electrical conducting means is respectively connected to each seating element by a permanent electrical contacting means.

15. The touch probe as claimed in claim 1, wherein each of the electrical conducting means is directly attached to at least one of the seating elements by means of one of a screw, a plug-in, a snap and a bayonet connection.

16. The touch probe as claimed in claim 15, wherein each of the electrical conducting means is respectively connected to each seating element by means of one of a screw, a plug-in, a snap and a bayonet connection.

17. The touch probe as claimed in claim 1, wherein the carrying elements comprise pin elements in accordance with DIN standards.

18. The touch probe as claimed in claim 17, wherein the carrying elements comprise pin elements in accordance with DIN 6325.

19. The touch probe as claimed in claim 1, wherein the sensing circuit comprises terminal contacts with spring contact pins.

20. The touch probe as claimed in claim 1, wherein the housing is cup-shaped and can be accessed only through a cup opening provided on one side thereof.

21. The touch probe as claimed in claim 1, further comprising a vibration device.

* * * * *